United States Patent
Evstratov et al.

(10) Patent No.: US 7,820,589 B2
(45) Date of Patent: Oct. 26, 2010

(54) COMPOSITE STRUCTURES IN AN AMORPHOUS STATE FOR PHOTOCATALYSIS

(75) Inventors: Alexey A. Evstratov, Saint Julien les Rosiers (FR); Cristian V. Chis, Ales (FR)

(73) Assignee: Armines, Paris (FR)

( * ) Notice: Subject to any disclaimer, the term of this patent is extended or adjusted under 35 U.S.C. 154(b) by 0 days.

(21) Appl. No.: 11/793,618

(22) PCT Filed: Dec. 16, 2005

(86) PCT No.: PCT/FR2005/051101

§ 371 (c)(1), (2), (4) Date: Sep. 26, 2007

(87) PCT Pub. No.: WO2006/064168

PCT Pub. Date: Jun. 22, 2006

(65) Prior Publication Data

US 2008/0085230 A1 Apr. 10, 2008

(30) Foreign Application Priority Data

Dec. 17, 2004 (FR) .................................. 04 53056

(51) Int. Cl.
*B01J 23/00* (2006.01)
(52) U.S. Cl. ...................... 502/350; 502/349
(58) Field of Classification Search ................. 502/350, 502/349
See application file for complete search history.

(56) References Cited

U.S. PATENT DOCUMENTS

| | | | | |
|---|---|---|---|---|
| 2,377,315 A | * | 6/1945 | Beitzel | ..................... 280/406.1 |
| 5,335,219 A | * | 8/1994 | Ovshinsky et al. | ........... 369/288 |
| 6,835,688 B2 | * | 12/2004 | Morikawa et al. | ............ 502/200 |
| 7,303,607 B2 | * | 12/2007 | Tempel et al. | .................. 95/241 |
| 2002/0169261 A1 | * | 11/2002 | Speca | .......................... 526/134 |
| 2003/0235653 A1 | | 12/2003 | Yu | |
| 2005/0020444 A1 | * | 1/2005 | Hiraoka et al. | ............... 502/350 |
| 2005/0227377 A1 | * | 10/2005 | Renavikar et al. | ............... 438/3 |
| 2007/0252110 A1 | * | 11/2007 | Chen et al. | ................... 252/500 |

FOREIGN PATENT DOCUMENTS

| | | |
|---|---|---|
| EP | 1 068 899 A1 | 1/2001 |
| JP | 2000334268 | 4/2001 |
| WO | WO-03/087005 A1 | 10/2003 |

OTHER PUBLICATIONS

Piyakis, Depostion of adhering metallic nonclusters on substrate, CA 2377315 A1.*
Dolgushev et al., "Synthesis and characterization of nanosized titanium oxide films on the (0001) $\alpha$-$Al_2O_3$ surface," *Thin Solid Films*, vol. 293, No. 1-2, pp. 91-95 (Jan. 30, 1997).
Karches et al., "Plasma-CVD-coated glass beads as photocatalyst for water decontamination," *Catal. Today: Catalysis Today*, vol. 72, No. 3-4, pp. 267-279 (Mar. 15, 2002).
Simon et al., "Effects of HCL Readsorption on Film Growth in Atomic Layer CVD of $TiO_2$," *Proceedings of the International Conference on Chemical Vapor Deposition*, vol. 97-25 pp. 131-138 (Sep. 5, 1997).

\* cited by examiner

*Primary Examiner*—Timothy C Vanoy
*Assistant Examiner*—Michelle Hou
(74) *Attorney, Agent, or Firm*—Fulbright & Jaworski, LLP

(57) ABSTRACT

The invention relates to photocatalysis.

It concerns a composite system, comprising a photocatalytic component (10) in an amorphous state and an active medium (12) designed to neutralize the free charge carriers of a first type, electrons or positive holes, in order to protect the charge carriers of a second type from recombination.

13 Claims, 4 Drawing Sheets

COMPOSITE STRUCTURES IN AN AMORPHOUS STATE FOR PHOTOCATALYSIS

This application is a §371 from PCT/FR2005/051101 filed Dec. 16, 2005, which claims priority from FR 04/53056 filed Dec. 17, 2004, each of which is herein incorporated by reference in its entirety.

The present invention relates to a new type of photocatalyser—composite structures in an amorphous state—which operates based on the phenomenon of the forced separation of free charge carriers (electrons, holes) preventing their immediate recombination.

EXISTING PRINCIPLES AND TECHNIQUES

The photocatalytic effect is based on the phenomenon of the stimulation of a semi-conductor by light rays (UV or Visible). The photonic stimulation causes the generation of "electron—positive hole" pairs which result from the passage of electrons from the valence band of the semi conductor to its conduction band. Because of the presence of forbidden zones which perform the role of energy barriers against the recombination of free charge carriers, these being able to access the surface of the solid body, attacking the absorption complexes and therefore promoting their transformation into end products.

Currently, only semi-conductors (solid crystalline body) in the form of micro- and nanoparticles are considered to be promising photocatalysers. Their crystallinity guarantees, on one hand, an effective separation of the charge carriers ($e^-$, $h^+$) and avoids their immediate recombination. On the other hand, the sizes of these crystallite particles are proportioned, preferably, in tens or hundreds of nanometers, in order to ensure that a great number of the free carriers have access to the contact surfaces. These proportions are compatible with the distances covered by the free charge carriers in a crystalline body during their average lifetime, as mentioned in reference [1] of the bibliography.

In that which follows, the numbers in square brackets correspond with the bibliographic references at the end of the present description.

Figure 1:
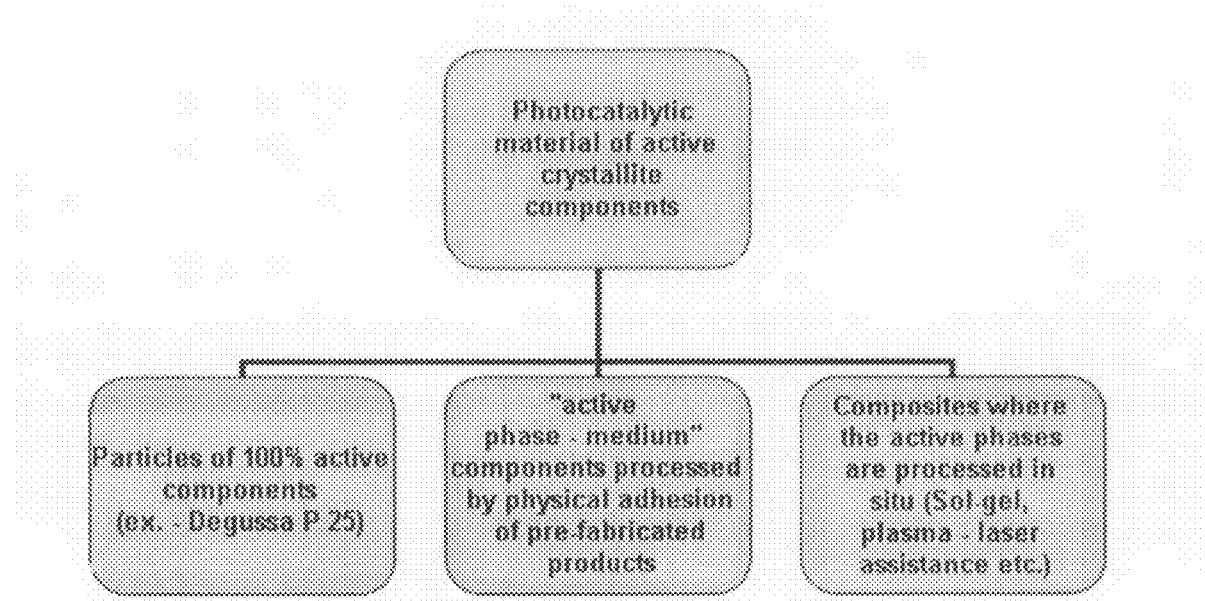

FIG. 1 presents 3 principal types of active materials known to demonstrate important photocatalytic capacities. These materials include photocatalytic components generally in the crystallite state.

The most widely used industrial photocatalyser is the product being sold by Degussa—Deutsche Gesellschaft, Germany (commercial name: Degussa P25, crystallite product in titanium dioxide containing ~80% of the anatase phase and ~20% of the rutile phase) [2].

Currently the processing of crystallite nanoparticles of titanium dioxide is carried out, in most cases, using techniques based on the application of plasma or by the Sol-gel process. The plasma techniques [cf. 3, for example] using the precursors of titanium, organic or inorganic, in a gaseous state which ionise at high temperatures. In the presence of oxygen, the ions $Ti^{4+}_{gas}$ transform into titanium dioxide $TiO_2$ clustered in nanoparticles. The Sol-gel process is based on the hydrolysis of the sols of alkoxides of metals of which the end products are metal oxides. The nanoparticles of $TiO_2$ can be processed, respectively, by the hydrolysis of titanium alkoxides under controlled conditions [4].

More sophisticated processes, such as Layer-by-Layer Self-Assembly (LBL-SA) [5] or ultrasonic Spray Pyrolysis (USP) [6], are also applied, at laboratory scale, for the fabrication of nanometric crystals.

The techniques described in [5,6] also permit the obtention of crystallite particles of an optimal size (10÷100 nm in diameter). These dimensions are considered to be the most appropriate for photocatalytic application.

However, the products produced by the processes in references [3-6] always represent "prefabricated" substances which afterwards need a solid fixation on the medium walls in order to be applied as elements of photocatalytic units. The only mechanism which permits the fixing of an existing crystallite particle ("prefabricated") to an external medium is its physical adhesion. Physical adhesion, on the other hand, does not permit the successful creation of composites which are sufficiently stable. Mechanically very fragile, these systems rapidly degrade during use.

In order to avoid these difficulties relating to the manipulation of prefabricated crystallite nanoparticles, it is sensible to envisage replacing them with composite products which can have an active phase chemically grafted in situ onto a medium.

Current scientific documentation presents a certain number of expensive and sophisticated techniques for the processing of composite products with photocatalytic properties (examples: Arc Ion Plating (AIP) [7], Dip-coating [8], Photo-Inducted Sol-gel [9], Plasma Associated Metallo-Organic CVD [10, 11], Sputtering [12, 13], Photo-assisted pulsed laser deposition [14], etc.).

Currently, these processes do not exceed laboratory scale. On the other hand, their application allows the processing of composite structures containing $TiO_2$ crystallite nanoparticles grafted onto various porous supports ($SiO_2$, $\gamma$-$Al_2O_3$, active carbon, etc.). In general, these products demonstrate a photocatalytic activity comparable to that of the Degussa p25.

The techniques [7-12, 14] and other modern techniques are required for the processing of composite photocatalysers which have active phases presented by crystallite nanostructures. In cases where the active components are initially formed as disorganised structures, they undergo complimentary treatments, such as irradiation or calcination, in order to transform them into a crystallite state, as described in [11].

Apart from some rare references (for example [13, 15, 16]), non crystallite materials are not considered to be photocatalytic products because of their disorganised structures which favour an immediate recombination of charge carriers. In effect, the absence in the disorganised structures of internal energy barriers (forbidden zones) reacting against the immediate recombination of charge carriers is considered to be a fatal obstacle preventing the amorphous products from competing with the crystallite products.

THE INVENTION

The invention relates to a composition and an operating principle of a composite photocatalyser having an active phase which constitutes nano- and micrometric spherical aggregates of titanium dioxide in an amorphous state, chemically linked with the surface of a medium which demonstrates strong acidic or Lewis base properties and therefore performing, during the active phase, the role of the source of an external electric field causing the forced separation of free charge carriers by neutralisation (trapping) of charges of a first type (negative or positive) in favour of another.

More particularly, the invention is the result of the hypothesis that it is possible to make amorphous structures work as heterogeneous photocatalysers by separating the charge carriers using an external force. The role of this external force can be performed by the interactive energy between opposing electrical charges. For example, carriers of a first type, negative or positive, can be selectively neutralised in situ by a medium demonstrating particular types of electrical properties—acceptor or donor properties. In this favourable situation the carriers of a second type are protected against immediate recombination.

Thus the invention refers to composite structures in an amorphous state which operate according to the phenomenon of forced separation of free charge carriers (electrons, holes) preventing their immediate recombination.

Acceptor mediums which have important levels of Lewis acidity, such as silica, aluminium oxide, aluminium phosphate or zirconium oxide are the only ones which are used when combined as electron traps, whilst metal mediums demonstrating strong Lewis base properties are used as hole traps.

Thus, the invention relates, generally, to a composite system comprising a photocatalytic component in an amorphous state and an active medium intended to neutralise the free charge carriers of a first type, electrons or positive "holes", in order to protect the charge carriers of a second type against recombination.

In one embodiment, the active medium is an acceptor medium high in Lewis acidity.

Alternatively, the active medium is a donor medium.

According to one embodiment, the photocatalytic element (active component) is made of disorganised (amorphous) nano- and microparticles of titanium dioxide chemically linked to a medium in order to ensure an effective transfer of neutralising carriers towards the mass of the acceptor or donor medium.

The invention thus concerns, in one embodiment, the use of titanium dioxide as an active component of the photocatalytic processes. It substitutes the crystallite structures currently used in the practice, with composite products consisting of amorphous nanoaggregates of TiO2 chemically fixed to the surfaces of solid mediums having important electron accepting or donating capacities (acceptor/donor mediums).

The photocatalytic activity of amorphous TiO2 is due to the artificial separation of charge carriers (e–, h+) in the external electric field supplied by the acceptor/donor medium. This forced separation protects the charge carriers from immediate recombination and permits the carriers of a selected type to retain their free states when travelling towards the active surfaces. Carriers of a second type are neutralised in situ by the activity of the medium.

For the methods of the invention, an example is described which concerns the processing of composite products of type "amorphous nanoaggregates TiO$_2$—oxide medium having pronounced acceptor capacities".

The surfaces of amorphous oxides have several functioning groups. In ambient conditions and up to 250-300° C. they are enriched in active Brönsted sites (acid and base). This active population permits the chemical grafting onto the oxide surfaces of modifiers of various types.

The processing of TiO$_2$ composite structures, crystallite and amorphous, on mineral mediums can be carried out by most of the methods mentioned below. From the technological point of view, these composites can be processed notably by Sol-Gel, Sputtering, Plasma Assistance CVD and ML-ALE-CVD, which signifies Molecular Layering or, according to alternative terminology, Atomic Layer Epitaxy [17], 18]. The latter, thanks to its relative simplicity, appears to be the best adapted for the processing of the proposed products, in particular of the type "amorphous TiO2 nano-microaggregates—acceptor medium", under both laboratory and industrial conditions.

According to the ML-ALE-CVD process, a solid medium of which the surface has been pre-functionalised in order to enrich it in active Brönsted sites, treated in situ by a volatile mineral precursor (for example, an oxy-halogen or halogen product—Me$_L$O$_M$Hal$_N$, Me$_L$Hal$_N$) or an organometallic product (for example, an alkoxide—Me$_L$-OR$_N$), then hydrolysed, transforms into composite material "nanometric oxide aggregate—medium" (reactions (1) and (2), example with the halogen precursor):

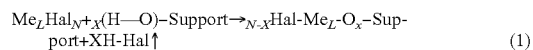

$$Me_L Hal_{N+X}(H-O)-Support \rightarrow_{N-X} Hal\text{-}Me_L\text{-}O_X\text{-}Support+XH\text{-}Hal\uparrow \qquad (1)$$

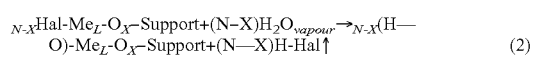

$$_{N-X}Hal\text{-}Me_L\text{-}O_X\text{-}Support+(N-X)H_2O_{vapour} \rightarrow_{N-X}(H-O)\text{-}Me_L\text{-}O_X\text{-}Support+(N-X)H\text{-}Hal\uparrow \qquad (2)$$

A series of composite products of the type "amorphous TiO$_2$ nanoaggregate—acceptor medium" can be processed using the ML-ALE-CVD method having special operative parameters.

The protection of free charges from recombination in situ by their forced separation can also be carried out by the active donor mediums which perform the role of enriching the photocatalytic aggregates in electrons. In this case, the oxide mediums of a high Lewis acidity (electron acceptors) can be replaced by porous mediums containing elementary metal aggregates distributed on their surfaces. These donor mediums supply additional electrons to the photocatalytic components by immobilising the positive charges (electronic holes). The processing of composite products of the type "amorphous TiO2 nano-microaggregate—donor medium" can be carried out by one of the techniques devised for the creation of oxide deposits on metal surfaces, for example the Sol-Gel technique.

Figure 2:
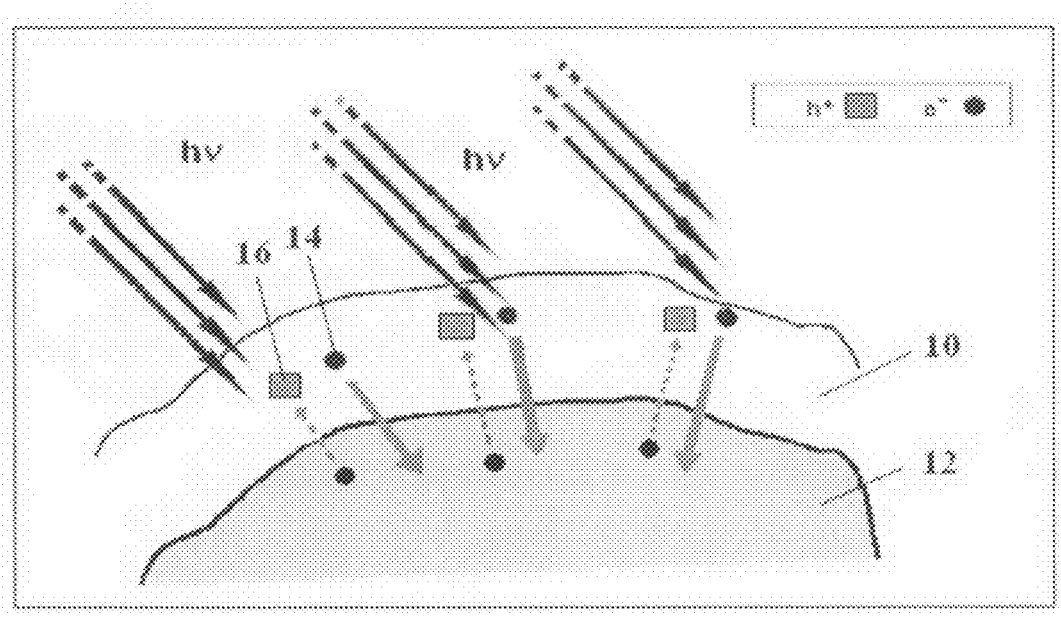

FIG. 2 represents a system according to the invention which includes an active component 10 in an amorphous state, and an acceptor medium 12 high in Lewis acidity or a donor medium. In the case of an acceptor medium the electrons e$^-$ 14 travel towards the medium 12. In the case of a donor medium the electrons of the medium travel (marked with dotted lines) towards the holes h$^+$ 16 of the component 10.

DETAILED EXAMPLE OF EMBODIMENT

The composite products according to the invention contain amorphous TiO2 nanometric aggregates grafted onto silica (SiO$_2$) and to activated aluminium oxide ($\gamma$-Al$_2$O$_3$) mediums, as well as onto complex mediums (SiO$_2$*Fe$^{3+}$, SiO$_2$*Cr$_2$O$_7^{-2}$, SiO$_2$*CrO$_4^{2-}$, $\gamma$-Al$_2$O$_3$*Fe$^{3+}$, $\gamma$-Al$_2$O$_3$*Cr$_2$O$_7^{2-}$, $\gamma$-Al$_2$O$_3$*CrO$_4^{2-}$). The addition of Fe$^{3+}$ or Cr$^{6+}$ to pure mediums was chosen in order to better demonstrate the functioning mechanism of the composites "amorphous TiO2—, microaggregates—acceptor medium". However, these additions are not indispensable for the improvement of the photocatalytic properties of the composite products according to the invention.

The oxides that were chosen—SiO$_2$, $\gamma$-Al$_2$O$_3$—as active mediums are strong Lewis acids (electron acceptors). They are capable of immobilising the negative charges (electrons) [19, 20] while leaving "free" the positive charges (electronic holes) in the surface structures stimulated by the light rays. Electronic holes are considered to be strong oxidants which favour the effective degradation of pre-absorbed products on the surface [21].

In order to test the photocatalytic activity of the processed samples, two reactions of the total oxidation of volatile organic compositions were chosen: The photocatalytic incineration of trichloroethane vapour (C$_2$H$_3$Cl$_3$) and that of toluene vapour (C$_7$H$_8$):

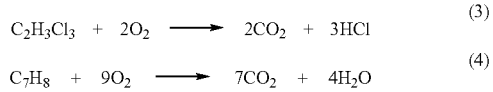

$$C_2H_3Cl_3 + 2O_2 \longrightarrow 2CO_2 + 3HCl \quad (3)$$

$$C_7H_8 + 9O_2 \longrightarrow 7CO_2 + 4H_2O \quad (4)$$

One of the products of the total oxidation of trichloroethane is hydrochloric acid, HCl (reaction (3)). Its high solubility in water (700 volumes HCl to 1 volume water in standard conditions) permits the monitoring of the photocatalytic performances of trichloroethane $C_2H_3Cl_3$ by measuring the pH evolution in a receptacle that has been agitated downstream of the test installation. The second technique used for monitoring the photocatalytic performances of $C_2H_3Cl_3$ and of $C_7H_8$ was the chromatographic technique (chromatograph Hewlett-Packard 5890 series II, with an HP 5972 detector (FID)).

The photocatalytic tests were carried out under laboratory conditions. The operating parameters are presented in table 1. All composite samples tested contained on their surfaces between 6 and 7% in the mass of TiO2 in an amorphous state (product No 3-5 and 7-9 in table 2 below or crystallite product No 2 in table 2).

TABLE 1

Operating conditions

| Parameters | Value |
| --- | --- |
| Initial concentration of trichloroethane and of toluene in the gaseous phase | $C_0$ = 35-40 ppm |
| Relative humidity of gas for treatment | $\varphi$ = 40% |
| Flowrate of gas for treatment | G = 400 ml/min |
| Residence time of combined gases in the reaction zone | $\Delta\tau \approx$ 12 s |
| Dimensions of test reactor (tubular reactor) | L = 13 cm, D = 3.5 cm |
| Mass of photocatalyser in the reaction zone | $m_{cat}$ = 1.1 g |
| Characteristics of irradiation source | Lamp UV "black light", $\lambda$ = 365 nm, 6 W |

By comparing the photocatalytic samples on the pure silica and activated aluminium oxide mediums, it is noticeable that there is an important level of activity for the first and a low level of activity for the latter (table 2, samples 3 and 7).

This difference in photocatalytic activity can be explained by the particularities of the dynamic systems "$TiO_2$—$SiO_2$ and $TiO_2$-$\gamma Al_2O_3$". In effect, the capacities of silicas as acceptor mediums greatly exceed those of aluminium oxides, thanks to the presence on the surface of silicas of very strong Lewis acid sites [19].

The activities of the samples based on the Degussa p25, both pure and on an acceptor medium, remain superior to those of composite "amorphous TiO2—pure aluminium oxide" (samples 1, 2 and 7 in table 2), whereas the composite "amorphous TiO2—pure silica" (sample 3) greatly exceeds the products based on the Degussa p25.

TABLE 2

Photocatalytic activity of products in the reaction of the total oxidation of trichloroethane $C_2H_3Cl_3$

| No. | Sample | Type of medium: pure (Pr), saturated (Im) | Activity: $\mu mol/g_{cat} \cdot h \cdot 10^{-3}$ |
| --- | --- | --- | --- |
| 1 | Degussa P25 pure (6.2 g) | Cardboard (fixation by adhesion) | 15 |
| 2 | SiO$_2$ + Degussa P25 | Pr—SiO$_2$ (fixation by adhesion) | 50 |
| 3 | S-1T-CVDm-070504 | Pr—SiO$_2$ | 610 |
| 4 | SF-1T-CVDm-230404 | Im Fe$^{3+}$—SiO$_2$ (with 1.5% Fe$_2$O$_3$) | 220 |
| 5 | SC-1T-CVDm-300404 | Im Cr6+—SiO2 (with 1.5% Cr2O3) | 400 |
| 6 | SiO$_2$ | — | 0 |
| 7 | A-1T-CVDm-290304 | Pr-$\gamma$Al$_2$O$_3$ | 2 |
| 8 | AF-1T-CVDm-200404 | Im Fe$^{3+}$-$\gamma$Al$_2$O$_3$ (with 1.5% Fe$_2$O$_3$) | 20 |
| 9 | AC-1T-CVDm-300404 | Im Cr6+-$\gamma$Al2O3 (with 1.5% Cr2O3) | 400 |
| 10 | $\gamma$-Al$_2$O$_3$ | — | 0 |

In an effort to improve the photocatalytic performances of composite products, a series of samples were processed on oxide mediums doped in electron traps (composed from a base of transition metals). The aim of this approach was to create acceptor mediums with higher capacities. As doping components, ferric oxides (Fe$_2$O$_3$) were used which presented active sites in the form of cations Fe$^{2+}$ and Fe$^{3+}$. Anionic chrome complexes (chromates and bichromates—$CrO_4^{2-}$, $Cr_2O_7^{2-}$) were also applied.

The processing of doping mediums was carried out by initial saturation of the mediums (SiO$_2$, $\gamma$-Al$_2$O$_3$) with metallic salt solutions, followed by their thermal conditioning and treatment (conditioning—24 h, ambient temperature; drying—8 h, temperature 110° C.; calcination—4 h, temperature 550° C.).

The data presented in table 2 shows an important improvement in the photocatalytic activity of the samples [$\gamma Al_2O_3$—Fe$^{3+}$]*TiO$_2$ and [$\gamma Al_2O_3$—Cr$^{6+}$]*TiO$_2$ (samples 8, 9) in comparison to the sample $\gamma Al_2O_3$*TiO$_2$ (sample 7). This phenomenon could be explained by the presence of, on the surfaces of the doped aluminium oxides ($\gamma Al_2O_3$*Me$_x$O$_y$), stronger acceptor sites than the initial sites (Al$^{3+}$) [20]. By comparison to the pure aluminium oxides, these medium complexes should therefore be considered as more effective acceptor agents in the forced separation of electrical charges.

On the contrary, the accepting capacities of electrons for the mediums [SiO$_2$—Fe$^{3+}$] and [SiO$_2$—Cr$^{6+}$] were considered lower compared to those of pure silica: The photocatalytic activities of samples 4 and 5 remain lower than the activity of sample 3 (table 2). These circumstances are due, very probably, to an exceptional number of sites Si$^{4+}$ such as Lewis acids [19].

It should be noted that the influence of the mediums of origin (SiO$_2$ and $\gamma$-Al$_2$O$_3$) on the effectiveness of the charge separation rapidly diminishes when they are enriched in doping components. For example, samples 5 and 9 (table 2) demonstrate the same photocatalytic activities, even when sample 5 is processed on a medium of SiO$_2$ and sample 9 on a medium of $\gamma$-Al$_2$O$_3$.

The best results are obtained when using the acceptor medium of pure silica (sample 3 in table 2). This fact demonstrates that it is not necessary to supply additional acceptors (electron traps) in the composite products of type "amorphous TiO2 nano-microaggregates—acceptor medium" where the medium is composed of silicas.

Figure 3:
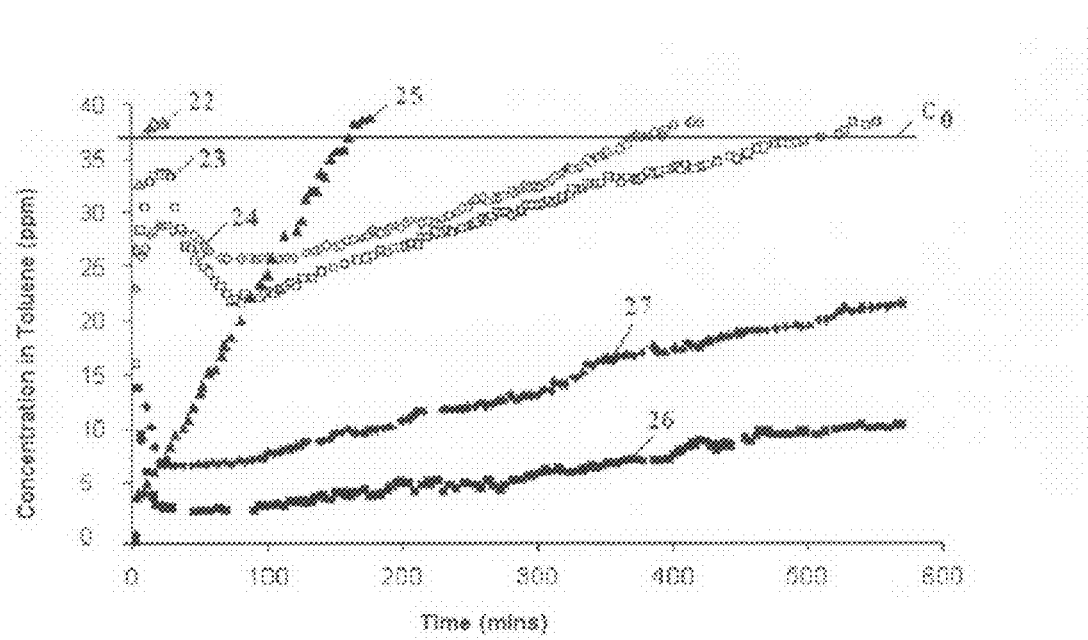

FIG. 3 represents the temporal evolution of the concentration of toluene downstream of the photocatalytic unit. Curves 22-24 comprising empty triangles, squares and diamonds correspond respectively with the Degussa p25 curves without light, of the composite "silica—TiO2" without light and of the composite "aluminium oxide—TiO2" without light. Whilst curves 25-27 comprising filled triangles, squares and diamonds correspond respectively with the Degussa P25 curves with light, of the composite "silica—TiO2" with light and of the composite "aluminium oxide—TiO2" with light.

Table 3 below represents the photocatalytic activity of products in the reaction of the total oxidation of toluene C7H8:

| No. | Sample | Absorption capacity without light µg/mg$_{cat}$ | photocatalytic activity µg/mg$_{tiO2}$*h | Content of TiO2 in the composite sample, mg |
|---|---|---|---|---|
| 1 | SiO2 - TiO2 | 1.40 | 4.10 | 62 |
| 2 | γAl$_2$O$_3$ - TiO2 | 0.90 | 1.80 | 59 |
| 3 | Degussa P25 | 0.01 | 0.35 | 60 |
| 4 | Cardboard - TiO2 | 0 | 0 | 53 |

The behaviour of the samples in respect of the photocatalytic treatment of air carrying toluene vapour represented throughout this table 3 and this FIG. 3 can be discussed in terms of the absorption capacities of porous composites and in terms of the electronic properties of the active mediums.

The best photocatalytic capacities are always manifested by the composites "amorphous TiO2 nano-, microaggregates—acceptor medium" of a silica base (sample 1 in table 3 and curve represented by full squares on FIG. 3). On the contrary, the composite sample of a cardboard base (No 4 in table 3) does not possess any activity because its medium does not have electron acceptor capacities and therefore cannot activate the amorphous TiO2 aggregates on its surface.

In the case of toluene $C_7H_8$ on which the solid surface absorption facilities are greatly superior in comparison with those of trichloroethane $C_2H_3Cl_3$, the sample of an activated aluminium oxide with the specific surrounding surface of 260-270 m$^2$/g having a photocatalytic activity superior to that of the Degussa p25 which has a specific surface of less than 50 m$^2$/g.

In the case of toluene and in that of trichloroethane, the photocatalytic activities are therefore reversed (cf. table 2 and 3). This phenomenon can be explained by the fact that the porous mediums, which have high absorption capacities, like silicas and activated aluminium oxides, can contribute to the photocatalytic performance of pre-absorbed products by transforming, at high speed, their absorbing complexes into end products. This hypothesis is verified by the comparative analysis of test results presented in the columns "absorption capacity without light" and "photocatalytic activity" in table 3, as well as by the comparison of curve appearance obtained with and without light in FIG. 3.

Figure 4:
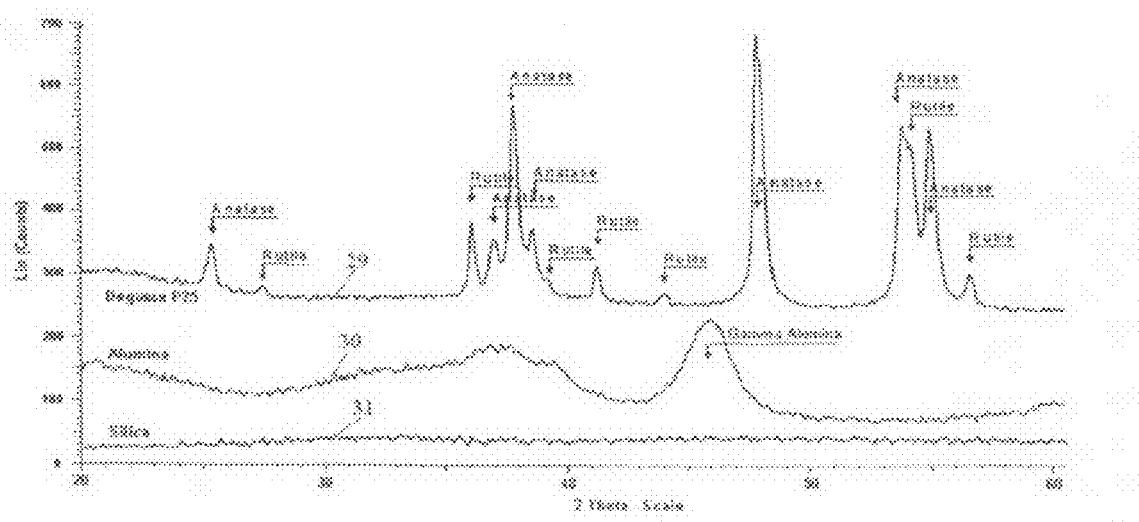

In addition, FIG. 4 shows the curves representing the state of crystallinity in samples using the XRD (X-Ray Diffraction) technique. These curves were obtained during analysis carried out by M. Pierre Gaudon from the Alès School of Mines.

This FIG. 4 demonstrates that the composite structures according to the invention are amorphous. In effect, curves 30 and 31 of products according to the invention based on aluminium oxide and silica possess values of a state of crystallinity largely inferior to those of the Degussa p25 represented by 29.

FIG. 5 shows images of the surface structure of mediums and of composite products according to the invention.

These images were obtained using an MEB (Sweep Electronic Microscope) by Paul Jouffrey of the Saint-Etienne School of Mines.

Figure 5A:
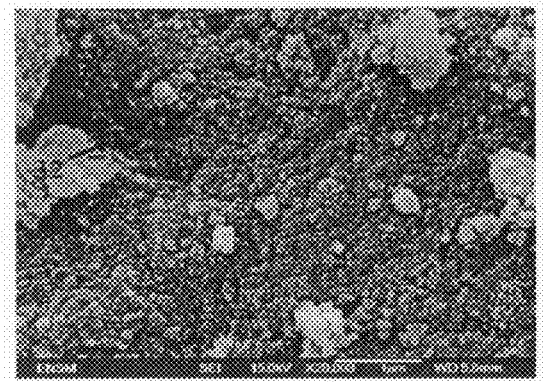
Figure 5B:
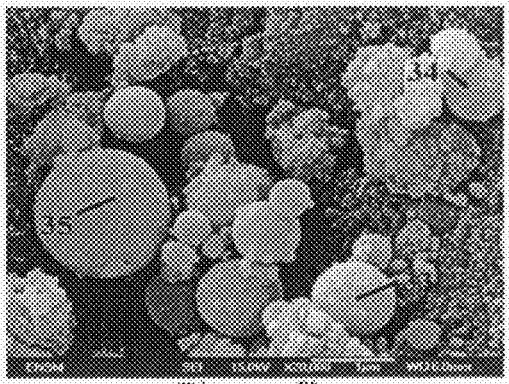

More precisely, FIG. 5a shows a surface of a medium 32 in aluminium oxide. And FIG. 5b shows aggregates 33-35 of TiO2 on the medium 32 in aluminium oxide.

Figure 5C:
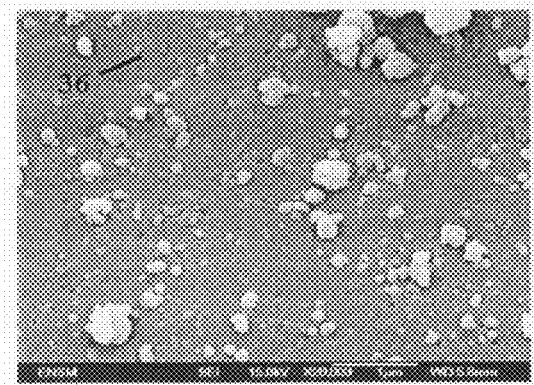
Figure 5D:
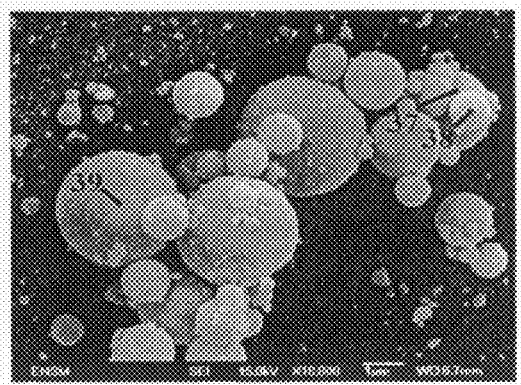
Figure 9:
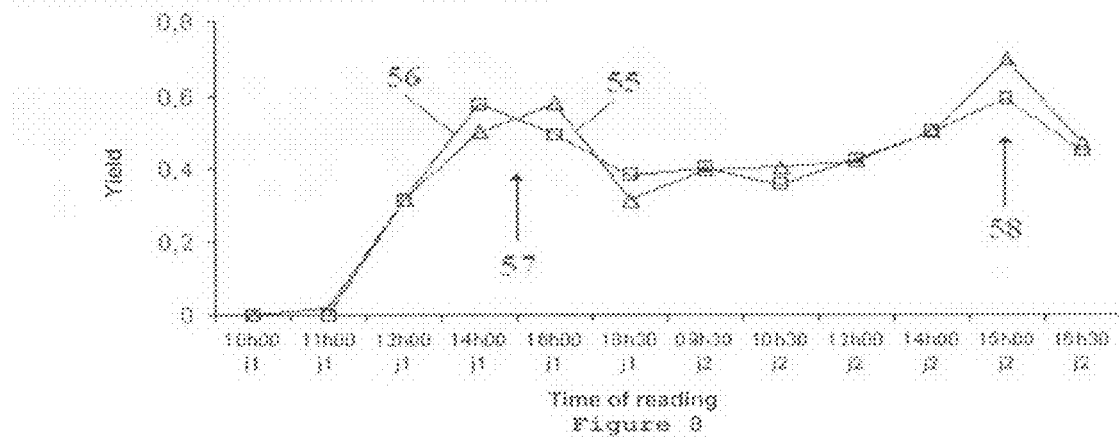

In addition, FIG. 5c shows a surface of a medium 36 in Silica. And FIG. 5d shows aggregates 37-39 of TiO2 on the medium 36 in Silica.

These aggregates are spherical and have an average diameter of between 500 and 2000 nm.

The Advantages of New Active Products (Photocatalytic Activity, Method of Production, Application):

The photocatalytic activity of amorphous composites "TiO2—porous acceptor medium (donor)" greatly exceeds those of the Degussa p25 (commercial photocatalyser, cf. table 2, samples 1 and 2).

Compared to pre-fabricated crystallite structures, the composites "amorphous TiO2 nano-, microaggregates—porous medium" are equally advantageous from a technological point of view (their simplicity of fabrication as an active element ready to be used and their fixing reliability onto the surfaces of mediums).

Their eventual application can therefore be very favourable in the processing of photocatalytic elements (reactor sections, active panels etc.) under industrial conditions.

It will be noted that the amorphous photocatalytic composites "TiO$_2$—donor medium" can be difficult to achieve in cases where the existing mediums are in the form of factory parts (tubes, plates, panels etc.) This drawback is caused by the non porous nature of metals.

Variations and Extensions of the Invention

Research has been carried out in order to demonstrate the sterilising capacities of composite products according to the invention.

FIG. 6 additionally show an experimental device for testing sterilisation capacities. The genetically modified *Escherichia coli* bacterium (source—INRA, France) was chosen as the bacterial species for testing.

Figure 6A:
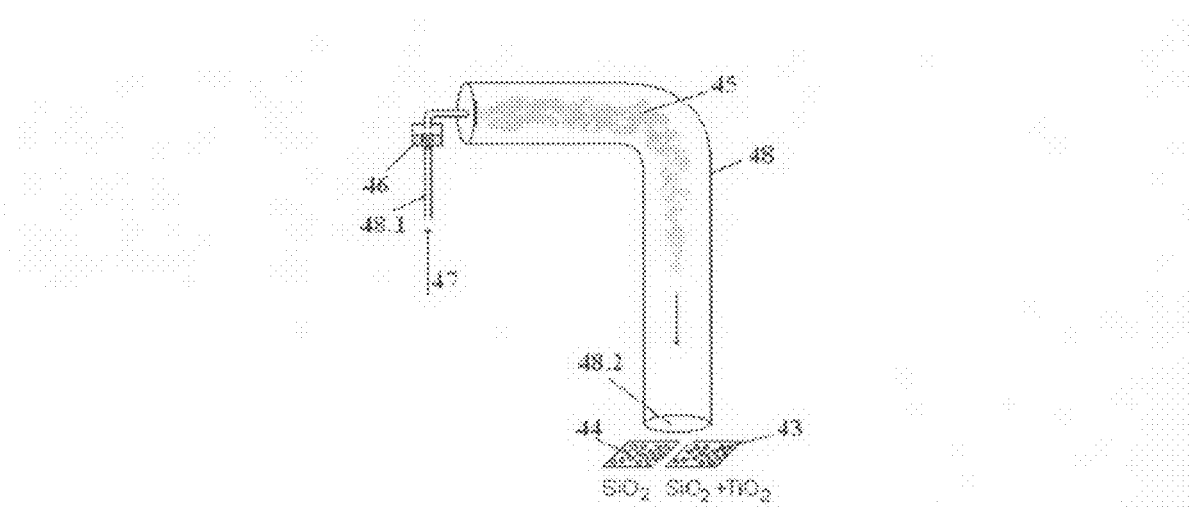

In a first stage represented on FIG. 6a, the photocatalytic composite samples 43 and the non-modified mediums 44 were soaked with a bacterial mist 45 during 3 minutes.

This mist 45 was obtained from dry air 47 and a bacterial solution 46 placed at an end 48.1 of a tube 48. This dry air 47 blown from the end 48.1 across the solution 46 in such a way as to create a bacterial mist 45. The mist 45 therefore circulates in the tube 48 and soaks the samples 43 and 44 which are at an end 48.2 of the tube 48 opposite to 48.1.

Figure 6B:
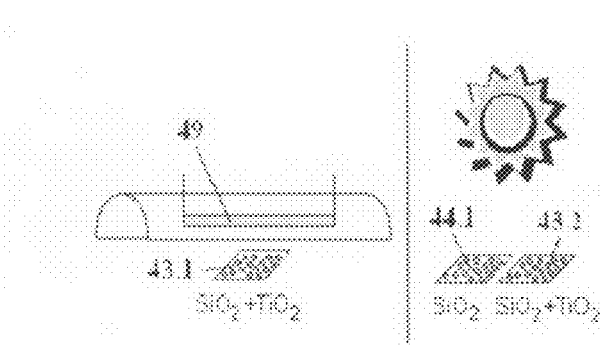

In a second stage represented by FIG. 6b, a sample of photocatalytic composites 43.1 was exposed to irradiation UV-A (wave length 365 nm) under an UV lamp 49. And a sample 43.1 of a composite according to the invention was exposed to sunlight. In addition, a non-modified medium 44.1 was exposed to sunlight. All of these exposures lasted 20 minutes.

Figure 6C:
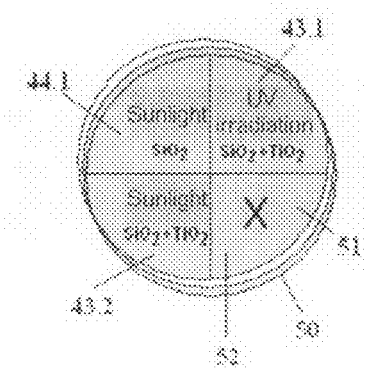

In a third stage represented by FIG. 6c, the samples 43.1, 43.2 and 44.1, or their surfaces were transferred into two Petri dishes 50 containing a nutritive gel 51. These dishes were left in the dark during 20 hours at 35° C. in order to promote the development of bacterial colonies. A part 52 of each dish 50 does not contain any of the sample and serves as a reference for the experiment.

Figure 7:
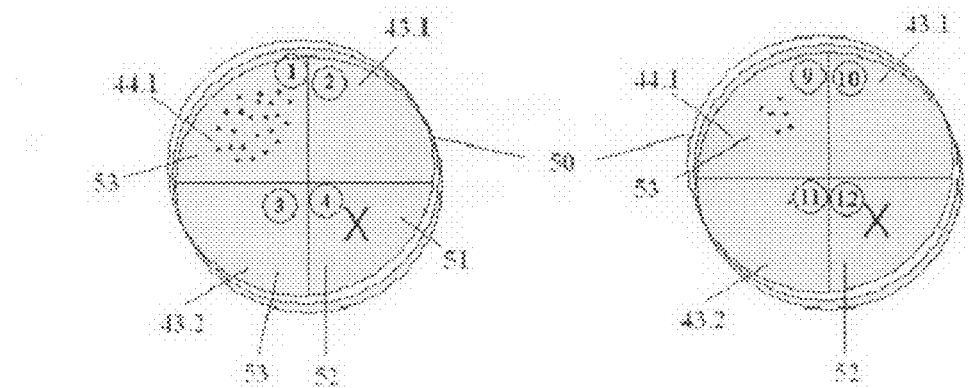

FIG. 7 represents the development of bacterial colonies in the Petri dishes, after conservation, for each of the aforesaid samples. These tests were carried out in cooperation with Christine Blachère-Lopez, of the Alès School of Mines.

In sectors 4 and 12 containing only the nutritive gel and serving as a reference sector, no bacterial colony developed.

In sectors 1 and 9 the dishes containing samples 44.1 of pure silica (non-modified medium) exposed to sunlight, respectively 21 and 6 bacterial colonies referenced 53 developed within 20 hours of incubation.

In sectors 3 and 11 containing samples 43.2 of a composite according to the invention exposed to sunlight, only one bacterial colony 53 developed.

In sectors 2 and 10 containing samples 43.1 of a composite according to the invention exposed to UV-A irradiation, no bacterial colonies developed.

In other words, 27 colonies (21+6) developed on the surfaces of the non-sterilised samples 44.1 against only one on the surfaces of samples 43.1 and 43.2 of the product according to the invention.

This data shows that the amorphous $TiO_2$ composite structures according to the invention demonstrated an important capacity for sterilisation both under artificial irradiation (UV "black light", $\lambda$=365 nm) and under sunlight.

These active products can therefore be conceived for the photocatalytic reduction of volatile organic compositions of a very large range, on condition that their initial concentration does not exceed certain limits (for example, for the gaseous phase—3÷5 ppm; this case corresponds to the conditioning of gas in confined spaces).

But these products can also be conceived as active products in the collective and individual protection from biological contamination.

An other area of application for amorphous composite photocatalysers according to the invention can be the treatment of waste liquids. Preliminary research was carried out to demonstrate the advantages of applying these proposed products in the photocatalytic purification of contaminated water by organic composites in solution.

Thus, FIG. 8 shows graphic representations of a photocatalytic degradation of acetone and ethanol in a liquid phase using active composites of an amorphous TiO2 base under sunlight.

A curve 55 consisting of triangles represents the degradation yield of acetone, whereas as a curve 56 consisting of squares represents the degradation yield of ethanol.

To obtain these curves 55 and 56, two liquid samples of 25 mL in volume containing 25 mg/L of acetone and ethanol in water were brought into contact with two samples of composites S-1T-070504 (sample No 3 in table 2) where their masses were of 1.1 g. Two identical liquid samples were brought into contact with two samples of 1.1 g of pure silica. Four Petri dishes were used as receptacles.

The mixtures were exposed to sunlight, under static conditions during 2 days.

The losses of acetone and ethanol during their photocatalytic degradation, taking into account the losses due to evaporation were monitored using the chromatographic method.

The degradation yields of organic products in solution were calculated by the differences between their remaining concentrations in the receptacles containing pure silica ($C_{SiO2}$) and their concentrations in the receptacles with photocatalytic composites ($C_{photo}$), in comparison to the values of $C_{SiO2}$.

The first readings were taken in a dark room, before the direct exposure of the samples to sunlight. Thus the points of 100 h00 and of 11 h00 of the first day of the tests present a negligible yield.

Next, the glass covered receptacles were taken out of the dark room onto a sunny terrace. On the yield curves 55 and 56, two peaks 57 and 58 correspond to the maximum sunlight hour (14 h-16 h). In a two day trial, the acetone and ethanol solutions in the receptacles containing the photocatalytic samples were completed degraded.

The variations and extensions of the invention can therefore be envisaged, at least in the field of water treatment, particularly for its purification and its sterilisation; thereby in the field of the collective and individual protection against biological contamination with, for example, the implementation of air conditioning devices in hospital sites, the creation of clothing and auto-sterilisation tools.

These photocatalytic materials according to the invention can be implemented on various mediums (porous ceramics, glass, cardboard paper, textiles etc.).

BIBLIOGRAPHY

[1] John Wiley & Sons, (1997), Heterogeneous Photocatalysis, *Hardcover;*

[2] www.degussa.com;

[3] I. Nakamura, N. Negishi, S. Kutsuna, T. Ihara, S. Sugihara, K. Takeuchi, (2000), Role of oxygen vacancy in the plasma-treated $TiO_2$ photocatalyst with visible light activity for NO removal, *Journal of Molecular Catalysis A: Chemical,* 161, 205-212;

[4] Robert D., Piscopo A., Heintz O., Weber J. V., (1999), Photocatalytic detoxification with $TiO_2$ supported on glass-fibre by using artificial and natural light, *Catalysis Today,* 54, 291-296;

[5] Tae-Hyun Kim, Sohn B. H., (2002), Photocatalytic thin films containing $TiO_2$ nanoparticles by the layer-by-layer self-assembling method, *Applied Surface Science,* 201, 109-114;

[6] V. Jokanovi, A. M. Spasi, D. Uskokovi, (2004), Designing of nanostructured hollow $TiO_2$ spheres obtained by ultrasonic spray pyrolysis, *Journal of Colloid and Interface Science,* 278, 342-352;

[7] T. Matsumea, T. Hanabusab, Y. Ikeuchi, (2002), The structure of TiN films deposited by arc ion plating, Vacuum, 66, 435-439;

[8] Ying Ma, Jian-bin Qiu, Ya-an Cao, Zi-shen Guan, Jiannian Yao, (2001) Photocatalytic activity of $TiO_2$ films grown on different substrates, *Chemosphere,* 44, 1087-1092;

[9] N. Kaliwoh, J.-Y. Zhang, I. W. Boyd, (2002), Surfaces Coating technologies, 125, 424;

[10] Lecheng L., Hiu Ping Chu, Xijun Hu, Po-Lock Yue, (1999), Preparation of heterogeneous photocatalyst ($TiO_2$/ Alumina) by metallo-organic chemical vapour deposition, *Ind. Eng. Res.,* 38, 3381-3385;

[11] M. Karches, M. Morstein, P. R. Von Rohr et al., (2002), Plasma-CVD Coated Glass Beds as Photocatalyst for Water Decontamination, Catalysis Today, 72, '267-279;

[12] M. D. Stamate, (2000), Dielectric properties of TiO2 thin films deposited by a DC magnetron sputtering system, Thin Solid Films, 372, 246-249;

[13] E. Ogino, K. Mori, Y. Kijima et al., (2001), Multilayer Structure and Process for Producing the Same, EP-1068899;

[14] J. Y. Zhang, I. W. Boyd, (2002), Structural and electrical properties of tantalum oxide films grown by photo-assisted pulsed laser deposition, *Applied Surface Science*, 80, 40-44;

[15] H. Yumoto, S. Matsudo, K. Akashi, (2002), Photocatalytic decomposition of NOx on TiO2 films prepared by arc ion plating, Vacuum, 65, 509-514;

[16] S. Masami, (2000), Air Cleaner, Patent of Japan 2000334268;

[17] A. A. Malygin, M. O. Bashkin, A. B. Emelyanov et al., (1993), 5$^{th}$ European Congress on application of surface and interface analysis (Catania—Sicily, Italy), 313;

[18] T. Suntala, (1989), Mater. Sci. Rep., 4, 261;

[19] H. Noller, J. M. Parera, (1981), Active sites in catalysis. An approach based on coordination chemistry, J. Res. Inst. Catal. Hokkaido Univ., 29, No 2, 95-112;

[20] A. Evstratov, (2001), Incinération économique de composés organiques volatiles (COV) à l'aide des catalyseurs d'oxydes aux propriétés superficielles optimisées, Récents Progrès en Génie des Procédés, 15, 309-317;

[21] K. Rajeshwar, (1996), Photochemical strategies for abating environmental pollution, Chemistry and Industry, 454-458;

The invention claimed is:

1. A composite product, comprising:
   an active medium which demonstrates strong Lewis acid or base properties;
   a photocatalytic component comprising an active phase of spherical aggregates of titanium dioxide in an amorphous state chemically linked to an active medium surface, said photocatalytic component generating free charge carriers, electrons and positive holes when stimulated by light;
   wherein said active medium being an acceptor medium in a solid state having Lewis acid sites (cations), or a donor medium in a solid state having free electrons;
   wherein said acceptor medium is selected from a group consisting of silica, aluminum oxide, aluminum phosphate or zirconium oxide, manifesting Lewis acid properties; and
   wherein said donor medium is a metal medium manifesting Lewis base properties such that (a) when said active medium is an electron acceptor, the electrons of said photocatalytic component stimulated by the light are attracted by the acid sites of said active medium, and (b) when said active medium is an electron donor, the positive holes of the photocatalytic component stimulated by the light are decimated by the free electrons of the active medium,
   thereby preventing the immediate recombination of the free charge carriers of the photocatalytic component.

2. The composite product of claim 1, wherein said photocatalytic component takes the form of a nano- or microagreegates.

3. The composite product of claim 1, wherein said active acceptor medium is doped with electron traps of a transition metal base.

4. The composite product of claim 3, wherein said transition metal oxide is ferric oxide.

5. The composite product of claim 1, wherein said active donor medium is doped by anionic chrome complexes.

6. The composite product of claim 1, wherein said active acceptor medium is doped with electron traps of a transition metal oxide.

7. The composite product of claim 6, wherein said transition metal oxide is ferric oxide.

8. The composite product of claim 1, wherein said active electron donor medium comprises a metal.

9. The composite product of claim 1, wherein said active acceptor medium is doped by anionic chrome complexes.

10. A method of purifying and chemically conditioning a gas or contaminated liquids, which comprises contacting the gas or contaminated liquids with the composite product of claim 1 and exposing to light to sterilize the gas or contaminated liquids.

11. The composite product of claim 1, wherein said active medium prevents recombination of free charge carriers, electrons or positive holes in said photocatalytic component when said photocatalytic component is stimulated by light to provide forced separation of free charge carriers generated by said photocatalytic component in an amorphous state chemically fixed on said active medium.

12. The composite product of claim 1, wherein said active medium generates an external electrical field for forced separation of free charge carriers and immobilization of a first type of carriers, electrons or positive holes, in favor of another.

13. The composite product of claim 1, wherein said active medium generates a forbidden zone or energy barrier for preventing recombination of free charge carriers, electrons or positive holes in said photocatalytic component.

* * * * *